(12) United States Patent
Levosky

(10) Patent No.: US 7,054,906 B2
(45) Date of Patent: May 30, 2006

(54) SYSTEM AND METHOD FOR CONTROLLING AND ORGANIZING EMAIL

(76) Inventor: Michael P. Levosky, 241 Lexington St., Woburn, MA (US) 01801

( * ) Notice: Subject to any disclaimer, the term of this patent is extended or adjusted under 35 U.S.C. 154(b) by 650 days.

(21) Appl. No.: 09/751,989

(22) Filed: Dec. 29, 2000

(65) Prior Publication Data

US 2002/0087641 A1    Jul. 4, 2002

(51) Int. Cl.
G06F 15/16    (2006.01)
(52) U.S. Cl. .................. 709/206; 709/204; 709/205; 709/209; 709/219
(58) Field of Classification Search ............... 709/201, 709/202, 203, 204–209, 219, 246
See application file for complete search history.

(56) References Cited

U.S. PATENT DOCUMENTS

| | | | | |
|---|---|---|---|---|
| 5,377,354 A * | 12/1994 | Scannell et al. | ............ | 718/103 |
| 5,619,648 A * | 4/1997 | Canale et al. | ............... | 709/206 |
| 5,930,479 A * | 7/1999 | Hall | ........................... | 709/206 |
| 5,961,593 A * | 10/1999 | Gabber et al. | ............... | 709/219 |
| 5,999,967 A * | 12/1999 | Sundsted | ..................... | 709/206 |
| 6,023,700 A * | 2/2000 | Owens et al. | .................. | 707/10 |
| 6,023,723 A * | 2/2000 | McCormick et al. | ....... | 709/206 |
| 6,108,691 A * | 8/2000 | Lee et al. | ..................... | 709/206 |
| 6,161,129 A * | 12/2000 | Rochkind | ................... | 709/206 |
| 6,167,434 A * | 12/2000 | Pang | .......................... | 709/206 |
| 6,212,553 B1 * | 4/2001 | Lee et al. | .................... | 709/206 |
| 6,266,692 B1 * | 7/2001 | Greenstein | .................. | 709/206 |
| 6,301,608 B1 * | 10/2001 | Rochkind | ................... | 709/206 |
| 6,334,140 B1 * | 12/2001 | Kawamata | ................... | 709/202 |
| 6,389,455 B1 * | 5/2002 | Fuisz | .......................... | 709/206 |
| 6,396,513 B1 * | 5/2002 | Helfman et al. | ........... | 709/206 |
| 6,487,584 B1 * | 11/2002 | Bunney | ...................... | 709/206 |
| 6,591,291 B1 * | 7/2003 | Gabber et al. | ............... | 709/206 |
| 6,643,685 B1 * | 11/2003 | Millard | ........................ | 709/206 |
| 6,643,686 B1 * | 11/2003 | Hall | ............................ | 709/206 |
| 6,643,687 B1 * | 11/2003 | Dickie et al. | ................ | 709/206 |

(Continued)

FOREIGN PATENT DOCUMENTS

EP    001059779 A2 *    5/2000

(Continued)

OTHER PUBLICATIONS

Gabber et al., Consistent Yet Anonymous, Web Access with LPWA, Feb. 1999, Communications of the ACM, vol. 42 No. 2, pp. 42-47.*

(Continued)

Primary Examiner—Ario Etienne
Assistant Examiner—Ramy M. Osman
(74) Attorney, Agent, or Firm—Mark P. White

(57) ABSTRACT

The method resides on a standard email system including a client computer that contains a physical email address and an email server. A client control program, which resides on the client computer and an alias email server, which communicates with the client over the data communications network, are added. The method includes entering the physical email address into the client control program, together with client identification information. The alias email server then generates an alias email address, which is communicated back to the user, and additionally is stored in the alias email server. The client then makes the alias email address available to selected correspondent. Response emails are intercepted by the alias email server, and either forwarded to the client, filtered, or blocked. The client is provided with a log of all transactions, including the time and date, alias email addresses, and other user-created information.

14 Claims, 9 Drawing Sheets

U.S. PATENT DOCUMENTS

| | | | | |
|---|---|---|---|---|
| 6,654,787 | B1* | 11/2003 | Aronson et al. | 709/206 |
| 6,721,785 | B1* | 4/2004 | Raghunandan | 709/206 |
| 6,829,631 | B1* | 12/2004 | Forman et al. | 709/202 |

FOREIGN PATENT DOCUMENTS

| | | | |
|---|---|---|---|
| JP | 200174802 A | * | 12/1998 |

OTHER PUBLICATIONS

Cranor et al., Spam!, Aug. 1998, Communications of the ACM, vol. 41 No. 8, pp. 74-83.*

Hall, Robert J., How to Avoid Unwanted Email, Mar. 1998, Communications of the ACM, vol. 41 No, pp. 88-95.*

Mazieres et al, The design, Implementation and Operation of an Email Pseudonym Server, 1998, 5th ACM Conference on Computer and Communications Security, pp. 27-36.*

Allen, Gemmy, Introduction to the Internet: Email, 1999, http://vct.tyler.cc.tx.us/EMAIL.HTML.*

Gabber et al., How to Make Personalized Web Browsing Simple, Secure and Anonymous, 1997, Lecture Notes on Computer Science, vol. 1318, pp. 17-32.*

The Lucent Personalized Web Assistant, May 1998, http://www.bell-labs.com/project/lpwa/system.html.*

Rice University, Using Elm for Electronic Mail, Jun. 24, 1997, Document UNIX 9, pp. 1-7.* http://web.archive.org/web/*/http://sneakemail.com, Sneakemail, archive dates Aug. 17, 2000 and Dec. 5, 2000 [access date Oct. 26, 2005].* http://www.spammotel.com-website Jun. 1, 2000.

* cited by examiner

Fig. 6

SYSTEM AND METHOD FOR CONTROLLING AND ORGANIZING EMAIL

BACKGROUND

Field Of The Invention

This invention relates to a system and method for controlling unwanted Email and organizing Email in general.

BACKGROUND

Description Of Prior Art

Email is now a universal means of communication, augmenting, and sometimes replacing other traditional forms of communication, including postal service, FAX, and voice communications. The ease of composing and the speed of transmitting Email, and the presence of the Internet in almost every corner of the world has promoted its use, which promises to become almost omnipresent.

The ease of use and speed of transmission has created problems, however, which include the transmission of unwanted messages, so-called "Spam", the equivalent of junk mail in postal service jargon. And unlike postal service junk mail, the transmission of Spam is virtually free for the senders, as most Internet Service Providers provide unlimited usage for modest fees.

Many Email systems provide means to filter and block unwanted messages. As an example, consider the system used by hotmail.com®, Microsoft's Website-based Email system, which can be accessed at http://www.hotmail.com.

In hotmail.com's blocking system, typical incoming Email can be directed to the user's Inbox if and only if:

(a) The Email address appears on the "To:" or "Cc:" line.

(b) The sender's address appears in the user's Hotmail Address Book.

(c) It is from a user in the hotmail.com or msn.com domain.

(d) It is a Hotmail WebCourier or Special Offers Subscription, Hotmail Member Letter, or is from Microsoft, MSN, or a Microsoft Passport partner site.

These blocking and filtering features are typical attempts to reject unwanted Email, or "Spam", but they have a number of drawbacks: For instance, many of these prior art systems blocking features do not allow Email communications which may be wanted by the recipient, although the recipient did not foresee communications from the sender. In addition, the unwanted sender of Email may continually change his Email address, so that the recipient cannot block Spam from a particular sender simply by blocking a single address. And finally, the Email recipient is constantly in danger of revealing his Email address to new potential Spammers by sending Email messages to new recipients.

The present invention overcomes these problems by the simple expedient of never revealing his true Email address, but rather by using a series of alias addresses which are first intercepted by an Alias Email server before being forwarded to the recipient, and by providing means for the recipient to identify the circumstances under which the alias Email address was issued, and to whom it was issued. When a particular alias Email address becomes the target of excessive Spam, the user can abandon that alias Email address, and create a new one.

In addition to controlling Spam, the current invention also provides a useful means for organizing Email messages in general. The invention provides a means to identify Email message as to a number of important parameters not provided by normal Email systems.

SUMMARY OF THE INVENTION

It is a general object of the current invention to provide a system and method to block unwanted Email form a user's Email client program. It is a further object of the invention to provide the user with an unlimited number of alias Email addresses which can be used or discarded as they become available to Spammers.

In accordance with one aspect of the current invention, a computer data communications network, including a client computer, an Email client, and an Email server provides the system for the method, which allows a user having a physical address, to control unwanted Email. The steps of the method include creating an alias Email server, entering the physical Email address into a Client Control Program by the user, and entering identification information into the Client Control Program by the user. Next comes the generating an alias Email address by the alias Email server, followed by the receiving an alias Email address by the Client Control Program, and the sending by the Email client program an Email message using the alias Email address to a recipient. Finally, the method provides for the receiving a message by the Email client program forwarded by the alias Email server, so that the recipient is unaware of the physical Email address.

In accordance with a second aspect of the invention, the method includes a displaying of a log of a multiplicity of transactions to the user by the client control program, the log further including the time and date of each transaction, the alias Email address of each transaction, and the identification information of the transaction.

According to a third aspect of the invention, the generating of the alias Email address further includes substantially random character generating.

According to a fourth aspect of the invention, the system further includes the entering one or more additional physical Email addresses into the client control program, and receiving an additional alias Email address corresponding to each additional physical Email address.

According to a fifth aspect of the invention, the method includes entering a request by the client control program for one or more additional alias addresses corresponding to each physical address, and receiving by the client control program an additional alias Email address corresponding to each such request.

According to a sixth aspect of the invention, the method further includes the entering a request by the client control program to suspend forwarding by the alias Email server to the Email client program of all Email addressed to a particular alias Email address.

According to a seventh aspect of the invention, the method further includes the entering a request by the client control program to permanently discontinue receipt by the Email client program of all Email addressed to a particular alias Email address.

According to an eighth aspect of the invention, the method further includes the generating by the client control program of an alias Email address containing a user name.

According to a final aspect of the invention, the method further includes the filtering the Email at the Alias Email Server.

DESCRIPTION OF DRAWINGS

These, and further features of the invention, may be better understood with reference to the accompanying specification and drawings depicting the preferred embodiment, in which:

FIG. 6 depicts an Email message forwarded to the user by the Alias Email Server.

DESCRIPTION OF THE PREFERRED EMBODIMENTS

Figure 1:
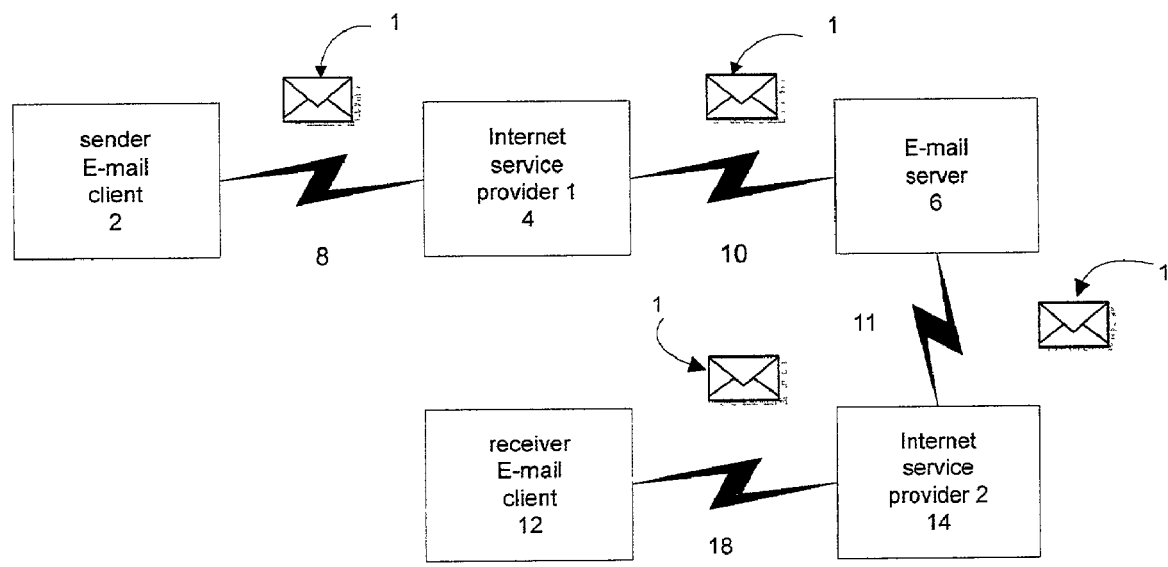
FIG. 1 depicts a block diagram of a popular prior art Email system.

The preferred embodiments are understood by first considering the prior art, as shown in FIG. 1. This figure begins with an Email client, a program which sends and receives Email. Clients include programs such as Eudora®, and Microsoft's Outlook Express®. Referring to this figure, the sender of the Email, using the Email client 2 sends and receives Email 1 using communication link 8, which connects the client to the Internet Service Provider 1 (ISP) 4. This ISP may include such major companies as America On Line® (AOL), or the Microsoft Network (MSN®). The ISP then communicates with the Email server 6, using communication link 10, via communication link 10. The communications links are bi-directional, with Emails being received and transmitted through the Email server. In turn, the Email server 6 is connected with other ISPs via other communications links.

The Email server 6 next transmits the Email to the recipient 12, who uses client software 12 to receive the Email. This communication 18, is usually done through the same or another ISP, shown as ISP 2 (14) in FIG. 1. The communication as shown in FIG. 1 is all bi-directional, so that the recipient, using receiver Email client 12, may send Email back to the sender client 2, in exactly the same manner as described above when the communication is from sender to receiver.

The Email address of the sender is included in the Email communication, so that the Email recipient may use the sender's Email address for any purpose desired. The recipient may sell the sender's Email address to third parties who collect Email addresses for the purposes of sending advertisements, or other communications to the sender, which the sender has not solicited. Such unsolicited Email messages are commonly known as "Spam".

The current invention avoids this problem by not revealing the Email sender's true Email address, but by instead utilizing an alias address which directs Email responses to an alias server, which may or may not retransmit the response Email to the original sender.

Figure 2:
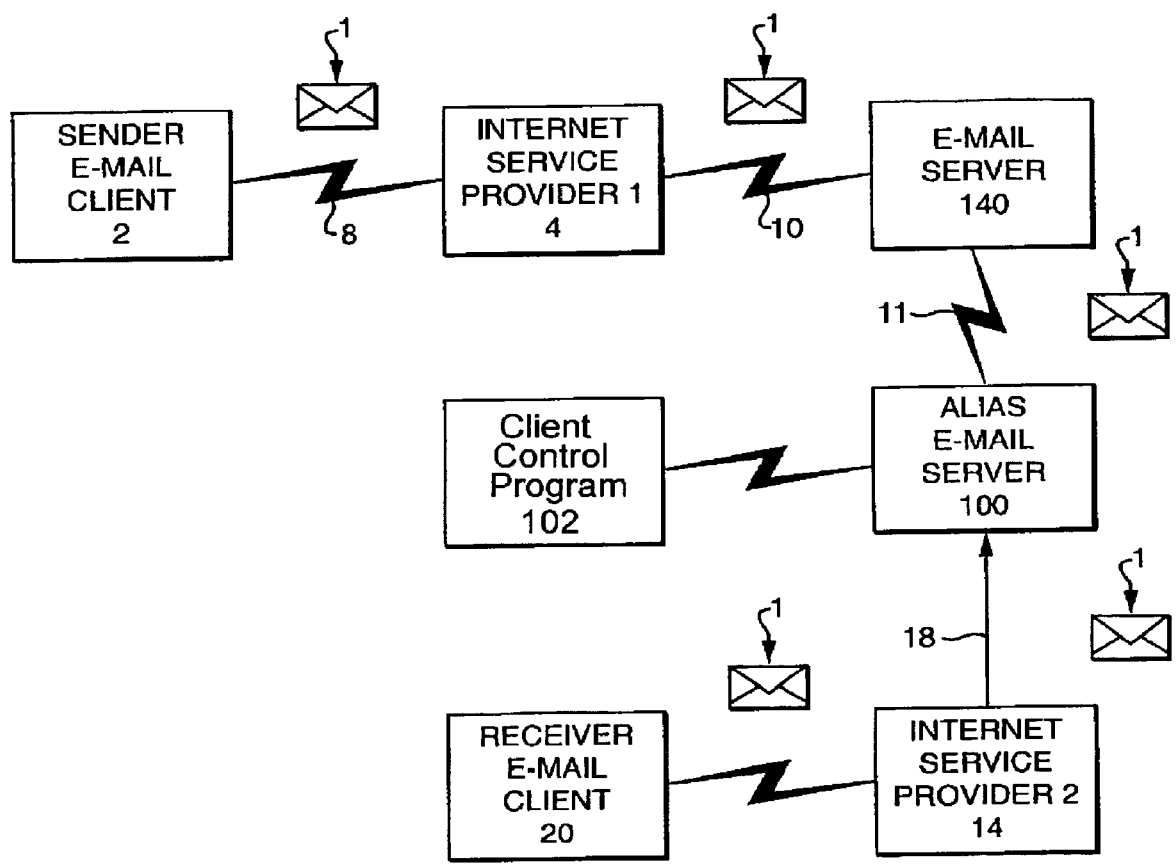
FIG. 2 depicts a block diagram of the current invention.

Referring now to FIG. 2, the current invention utilizes an Alias Email server 100 as an intermediary between the Email client 20 and the Email server 140. The client first communicates with the Alias Email server, which assigns the client with a new, unique alias Email address. This alias Email address is then used by the client when communicating with an Email recipient requesting an Email address from the client.

It should be noted that this system operates only under conditions that the sender's Email address is transmitted to the recipient by non-Email means. The sender may give his Email address to a recipient by letter, FAX, telephone, or by including it in a form contained within a WEB site requesting the sender's Email address. Thus, the communication shown in FIG. 2 is unidirectional only as between the Alias Email Server and the receiver Email client. That is, the receiver Email client 12, may communicate Email messages to the Alias Email Server 100 by this method, but not vice-versa. The Alias Email server will only send messages to clients registered to use the service provided by the Alias-Email Server.

Generating the Alias Email Address

The invention is implemented with the use of a client control program called "SpamMotel.exe", which resides on the client's computer, and which appears as reference number 102 in FIG. 2. When this program is started, it first displays the screen shown in FIG. 3.

Figure 3:
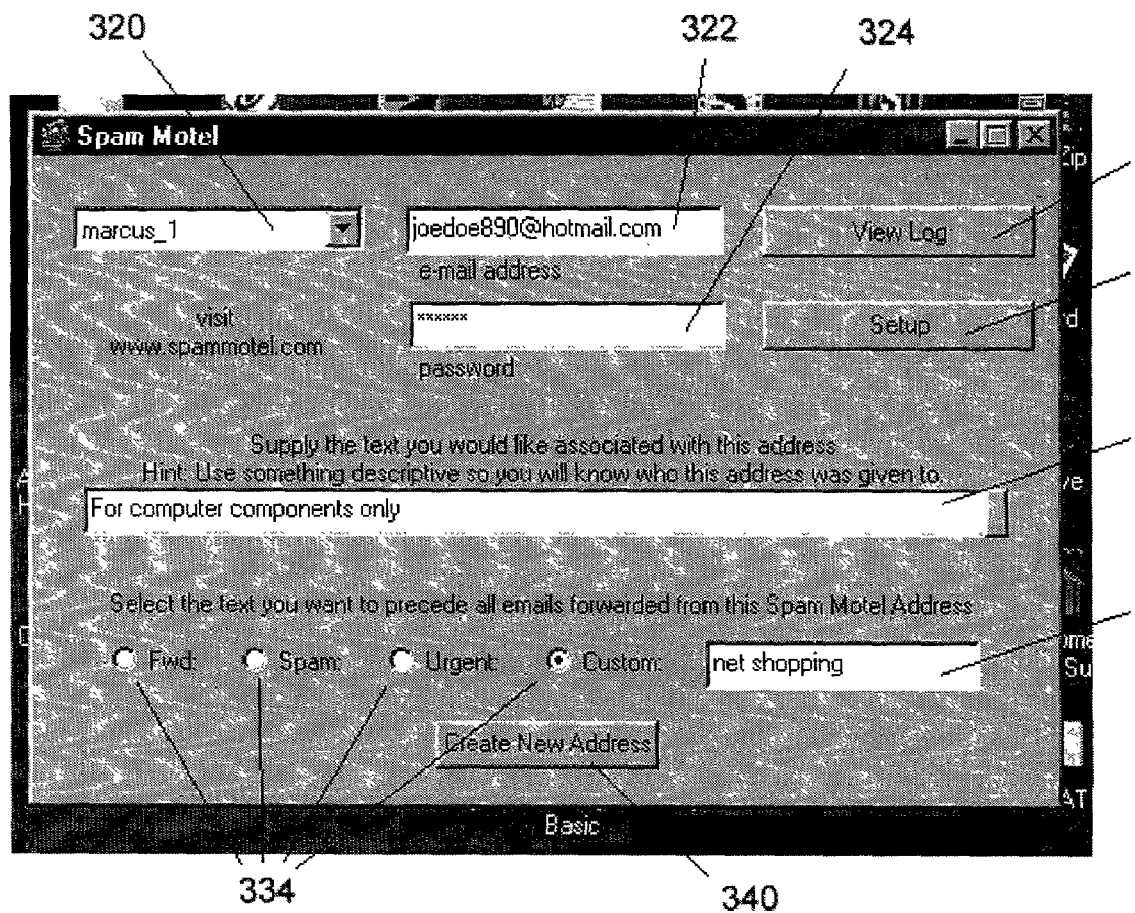
FIG. 3 depicts the startup screen of the Client Control Program of the current invention.
Figure 4:
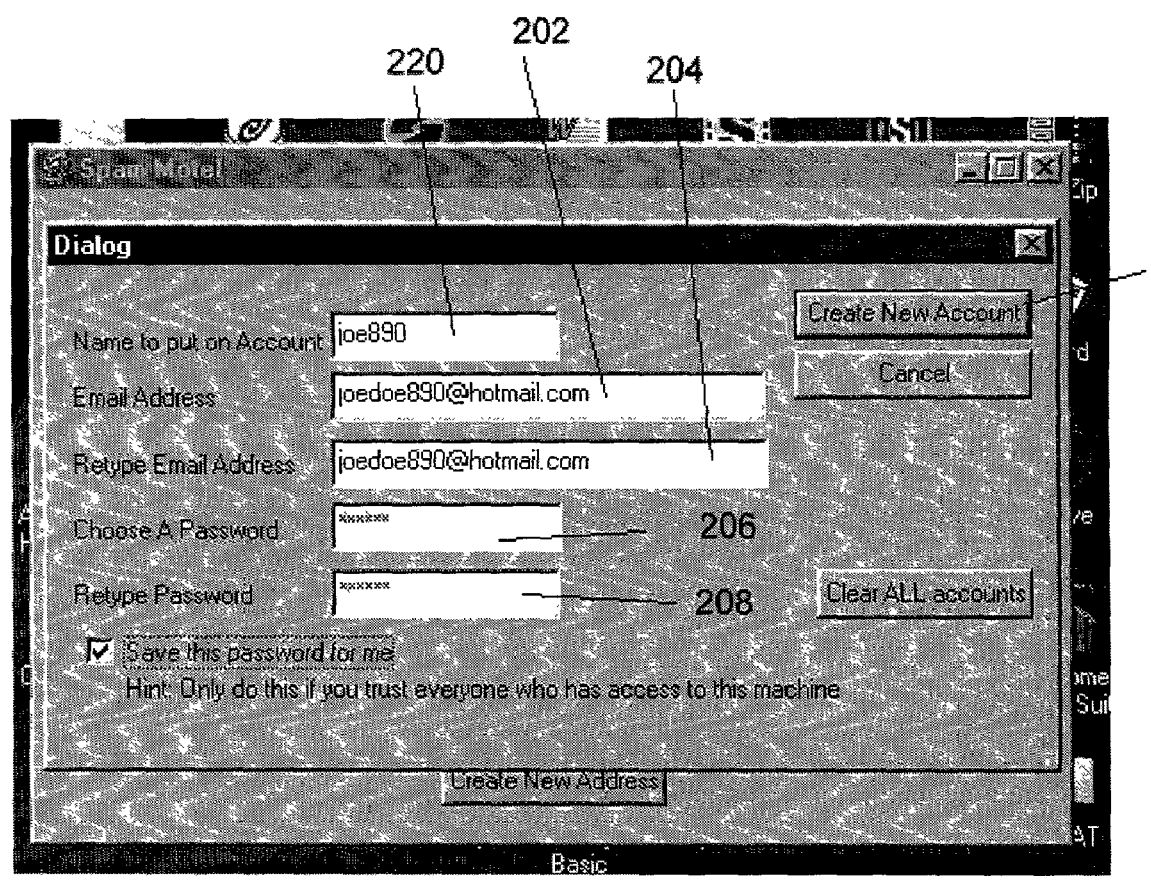
FIG. 4 depicts a setup screen of the Client Control Program of the current invention

Referring now to this figure, the client first enters an new account by clicking on SETUP button 228, which then displays the DIALOG window shown in FIG. 4. Referring now to FIG. 3, the user enters a user name, which may be anything the client desires, into box 220, and an actual (physical) Email address already in use in EMAIL ADDRESS box 202. The user must retype his Email address again in box 204, as an error reduction technique. The user may then make up a password, and type it into box 206, and repeat the same password in box 208. The user may check off a box to save the password, providing different levels of security for each account. The user then clicks on the CREATE NEW ACCOUNT button 222, and is then returned to the original screen, as shown in FIG. 3.

Referring again to FIG. 3, the information just entered is displayed. The pulldown list 320 shows the user name just created. However, the user may create a number of different profiles, having different user names, corresponding to a number of different physical Email addresses used. The corresponding physical Email address is shown in box 322, and the password in box 324, although each character of the password is represented by an "x" in this screen. However, the user may change the password in box 324.

A message may be included to identify all Email associated with this user name by typing into box 326. In the example shown in FIG. 4, the message "For computer components only" will appear on all Email forwarded from the alias server associated with this user name. In addition, one of four TYPES 334 is selected. These TYPES include FWD, SPAM, URGENT, and a custom type which will display a message which the user enters in box 332. This TYPE message will appear as the SUBJECT of any Email forwarded by the Alias Email server.

Figure 5:
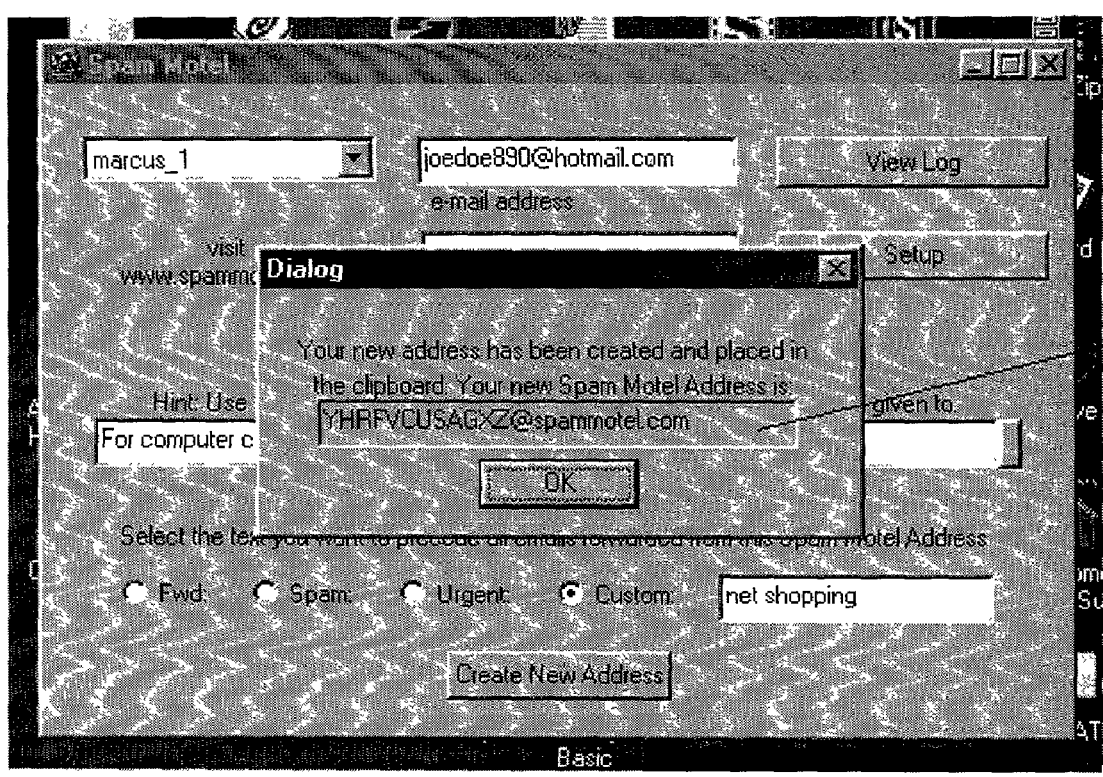
FIG. 5 depicts a screen delivering an Alias Email address to the user of the current invention.

The final step in the generation of a new alias Email address is done by clicking on the CREATE NEW ADDRESS button 340, which produces the screen shown in FIG. 5, in which a new window 400 appears.

Whenever the CREATE NEW ADDRESS button is depressed in the window shown in FIG. 3, the Client Control Program sends the information entered so far into the Client Control Program to the Alias Email server, which then enters this information into an alias user record in its master data file, and then generates a pseudo-random string of 10 characters, followed by "@spammotel.com", which constitutes the alias Email address corresponding to the user name 320, as shown in FIG. 3. This alias Email address is then entered into the alias user record in the datafile, which also contains the remainder of the user information corresponding to this user name.

It is generally recommended that the user create a new address whenever a new Website request for an Email address is made, so that the user can distinguish between responses from different vendors. Thus, additional alias Email addresses can be generated corresponding to the same user name, with or without different text features and TYPE selections. Thus, the database may contain more than one alias user record corresponding to the same user name. However, no two alias user records may contain the same alias Email address.

After a new address is created, the address is stored on the client system clipboard, so that it may be simply pasted into the appropriate box in any Web site form request from a correspondent requesting the Email address. In any event, the alias Email address is communicated to a recipient wanting to use an Email address to communicated with the sender.

Receiving Email having the Alias Email Address

Figure 6:
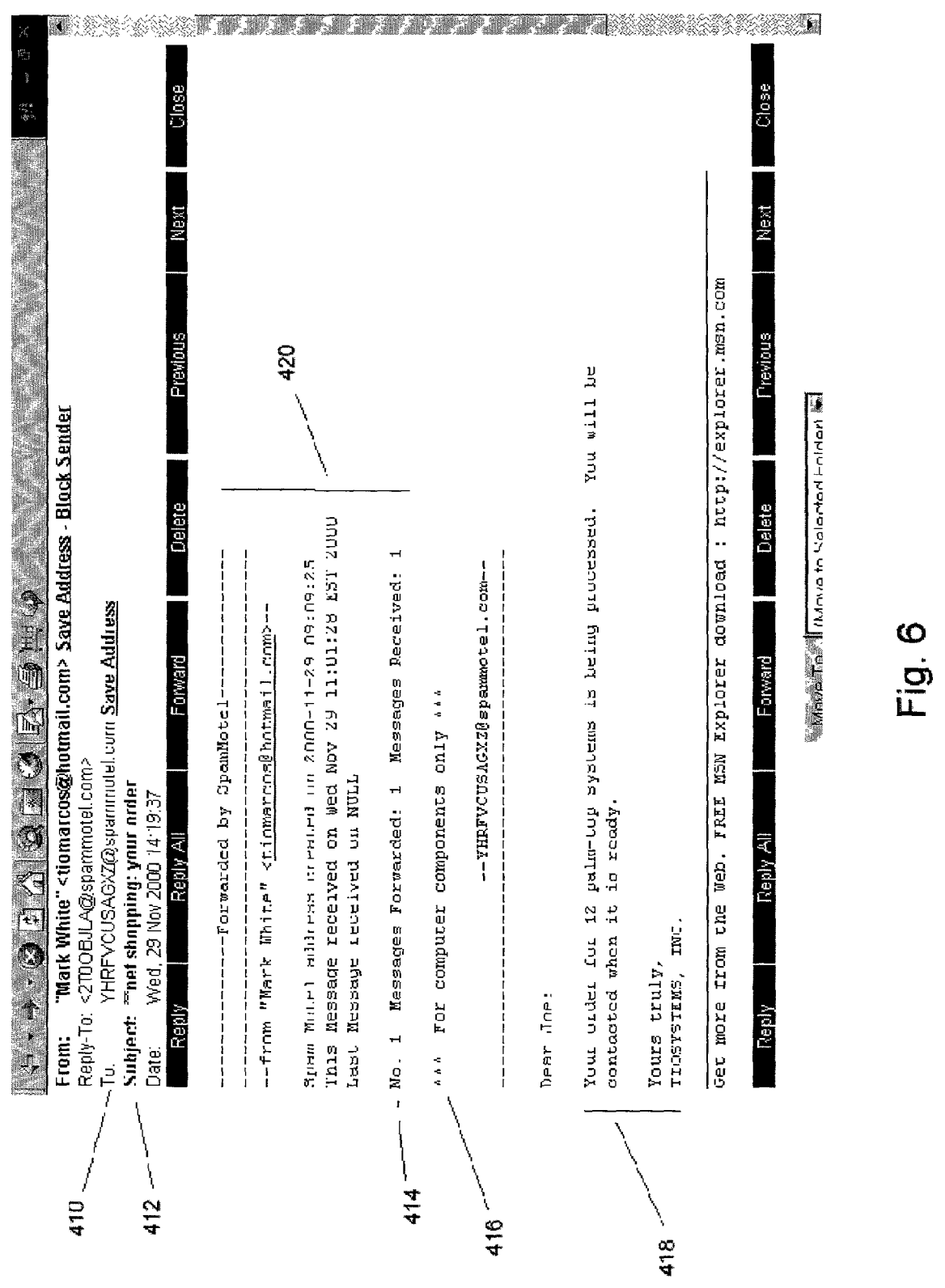

Assuming that the recipient (or any other Email client having the alias Email address) now sends an Email message to the user at the address just created by the Client Control Program, the Email message is received by the Alias Email Server, and modified by incorporating various information previously entered in the Client Control Program into the Email message. This modified message is then forwarded by the Alias Email Server to the sender's Email client 2. FIG. 6. depicts an example of such a forwarded Email message.

Referring now to FIG. 6, the actual message 18 sent by the recipient appears at the bottom on the screen. The screen contains other information concerning this message, however. First of all, the Alias Email address 410 appears next to the "To:" heading, indicating that the message was addressed to this Alias Email address by the recipient. Next, the "Subject" 412 of the message is the "custom" TYPE information entered by the user in box 332 as seen in FIG. 3. This subject, "net shopping" in the present example, is followed by a colon (:), after which the subject information entered by the recipient, follows, in the case, the text "your order".

Then a block of information 420 appears, indicating that this message was forwarded by the Client Control Program, and including the time and date of the message, as well as the time and date that the Alias Email address was created. The total number of messages forwarded and received 414 is shown. Finally, the "note", or "message" text previously entered by the user to identify this Alias Email address, shown as reference number 326 in FIG. 3, appears, to remind the user further about this particular Alias Email address.

This message text may be indefinite in length, unlike the "subject" text transmitted by normal Email, which is severely limited in length. The message text in the current invention is not sent within the Email header block, as in normal Email, but is incorporated into the body of the Email when transmitted back to the user. Thus, this message may be quite extensive, and must be sufficient in length to adequately describe the nature of the circumstances of the creation of the alias in question. It is typically used to remind the user why this particular Alias Email address was created and how it is used.

Using the "Reply" Function

The invention allows for the user to reply to Emails, while still keeping his or her physical Email address from the sender.

This is done by taking the recipient's original Email, as it first comes through the Alias Email server, and recording the recipient's Email address in the Alias Email server. If the user has used the 'reply-to' function based on current Email protocols, then that 'reply-to' address is the one that is recorded.

A special return code is then inserted in the 'reply-to' portion of the sender's Email 'header' information, overwriting any other information in that area of the header. SpainMotel's current return code is of the form ABCD123ER~spammotel.com (8 characters of mixed letters and numbers)

Thus, when the user clicks on the reply button of his Email client program, it is the new return code that is automatically placed in the 'to' header for purposes of replying. (This is handled this way by all current Email programs, based on current Email protocols and formats.)

With the new return code in place, when the user clicks on 'send' in his Email client program, the reply is sent to the Alias Email server instead of going directly back to the recipient. Next, the Alias Email server strips all information which could identify the user's physical Email address, and the user's Alias Email address originally given to the recipient used as the new 'replied-from' address. Thus the privacy of the user's real Email address is preserved.

The Alias Email server takes the further step of removing both the subject-line prefix that the user first set (the Fwd:, Spain:, Urgent:, or Custom:).

The Alias Email server also takes the further step of removing the information portion (memo, dates and times, etc.) from the body of the 'replied-to' Email, before sending it back to the recipient. Communication may thus go "back and forth" a number of times while preserving the "alias" form of user's email address.

Using the Log Information

The current invention allows the user to review the history of the various alias Email addresses created, and the messages received addressed to those alias Email addresses. A log is maintained on the Alias Email server of this history.

The log file is accessed either by clicking on the VIEW LOG button 342, as shown in the screen of FIG. 3, or by accessing the Alias Email Server WEB site at www.spammotel.com. In either case, the screen shown in FIG. 7 is displayed.

Figure 7:
FIG. 7 depicts the log produced by the Client Control Program of the current invention.

Referring now to FIG. 7, the history is displayed as a series of events, or transactions, each associated with a particular alias Email address. Referring to the even shown in block 430, the date of the event is displayed, in this case Nov. 29, 2000, and the time, in this case 9:09 AM. The number of messages received by the Alias Email server is shown, as well as the number of such messages forwarded to the sender's physical Email address. Because the sender may chose to block or filter messages, the number received and the number forwarded need not be the same.

Still referring to block 430, the contents of the TYPE parameter, shown as reference number 334 in FIG. 3, and the message, shown as reference number 326 in FIG. 3, is also displayed. And finally, the Alias Email address prefix is displayed.

The user may decide to block or suspend the forwarding of messages from the alias Email server by means of a check box 434, together with an action button, either the suspend button 440, or the resume button 436, which undoes the action of the suspend button. The user may also decide to filter message associated with a particular alias Email address by clicking the FILTER button 442, which then displays the screen shown in FIG. 8.

Figure 8:
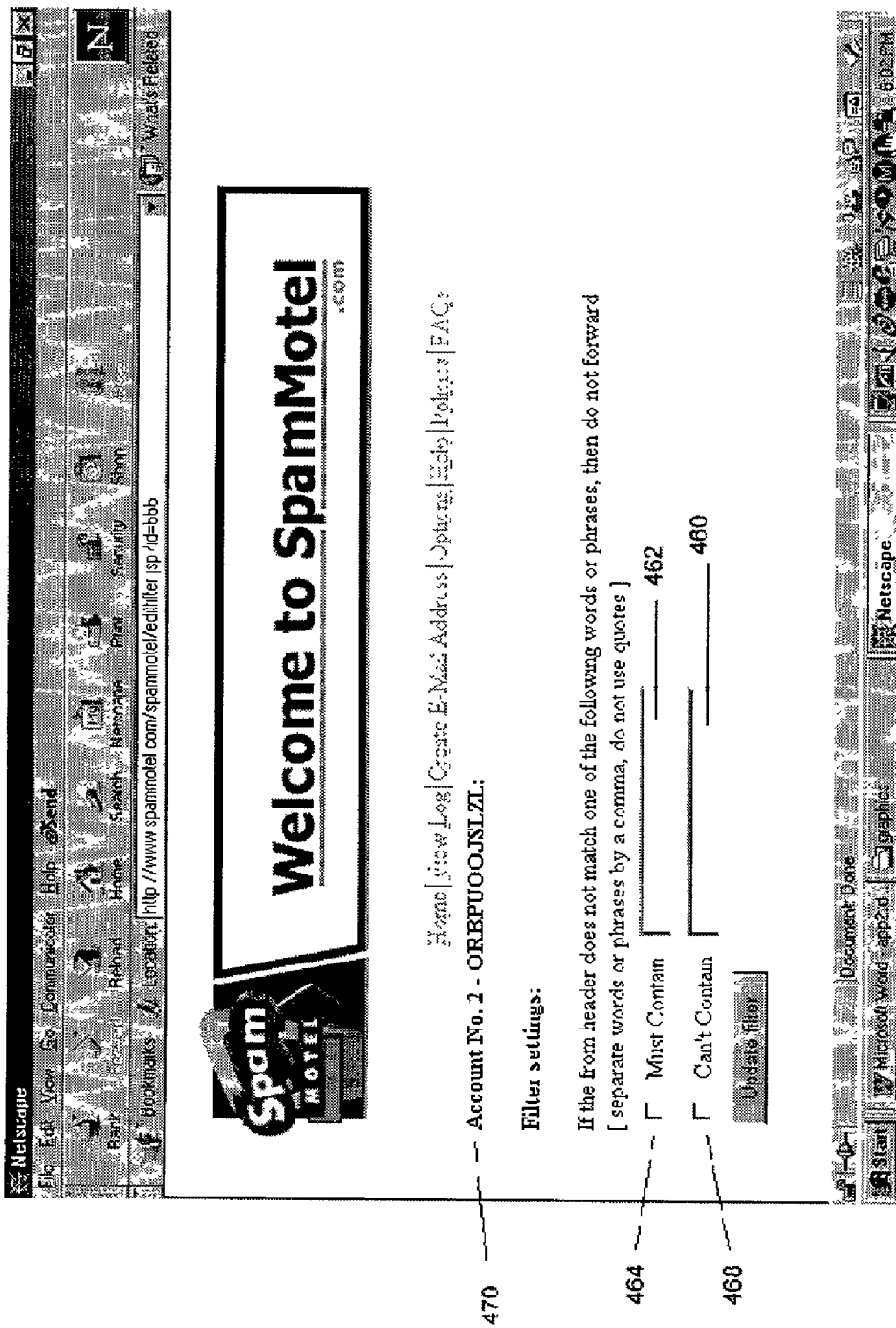
FIG. 8 depicts the screen of the Client Control Program used to filter or block unwanted Email messages.

Referring now to FIG. 8, the user of a particular alias Email address 470 may set up filters to either allow only those Email messages containing certain character combinations in the Email FROM header, or to reject those Email messages containing certain character combinations in the Email FROM header.

To use this feature, one of the check boxes 464, 468 must be checked, and the user enters the text string to be either accepted or rejected in the corresponding text box 460, 462. It should be noted that the Log Display, previously described, also allows the user to reject or suspend all mail addressed to a particular alias Email address in its entirety.

In order to make the log function more useful and convenient, a sort feature is incorporated into the log. Referring again to FIG. 7, a pull-down list 441 is available to allow the user to select a basis for sorting. These include sorts according to the date of creation of the event or transaction, the date received by the user, the status of the transaction (i.e. whether reception is currently suspended, or resumed), and the total transactions received so far.

In addition to the sort feature in the log file, provisions are also included to allow the user to search the log file for a text string contained within the message or notes field, or within the subject line prefix line, as shown in FIG. 6 as reference number 412.

Alternative Embodiment—Alias Email Server Incorporated Into Email Server

A number of WEB-based Email sites exist, including Hotmail® and Yahoo! Mail.® In these sites, the user's Email account is accessed by logging onto the appropriate Internet Site, http://www.hotmail.com in the case of Hotmail, and http://mail.yahoo.com, in the case of Yahoo! Mail. The functions of the Email server, in this case, exists on the host's Internet Site, and no Email client program is required for the user to send and receive Email.

When using such a system, it is not necessary to have a separate Alias Email Server, as all the functions of the Alias Email Server may be incorporated into the host's WebSite. The Alias Email Server may indeed be a separate program or process operating within the Email Server, or the functions may be otherwise incorporated into the Email Server.

In addition, the forwarding of the Email destined for the user and addressed to the user's alias Email address is performed by the combined Email Server/Alias Email Server. Nevertheless, for such combined systems, the terms "Alias Email Server", and "forwarding" of the Email will be used, referring in this case to the functions, rather than to specific software modules or systems.

The nature of this alternative embodiment does not require a stand-alone client program, as previously mentioned. Control by the user may be implemented by means of a browser plug-in, or a proxy setting in the browser itself. However the functionality of the system, as seen by the user, will remain the same as if there were a client program resident on the client computer.

In addition, an Email client program may also be used when at a WEB site requesting an Email address, and when it would be inconvenient for the user to return to the WEB-based Email program to generate an Alias Email address.

This alternative embodiment also provides alternative methods for displaying the "notes" messages, and other information used to identify the alias email address, including time and date of creation, and other statistical data shown in the log file display of FIG. 7. These alternative display methods include pop-up windows, linked to other screens which are displayed when the user clicks on the link. Segmented screens, or screens containing separated windows, may also display this information. The information may also be downloaded as a separate file.

Second Alternative Embodiment—Dashmail

The preferred embodiment of the current invention generates a random, or pseudo-random string of characters, which are used with the Alias Email server suffix, spam-motel.com. The resultant alias Email address is therefore not immediately recognizable by the user, who may use the message FROM header to identify the source of the message, or the message text associated with a custom TYPE 334, as shown in FIG. 3.

Figure 9:
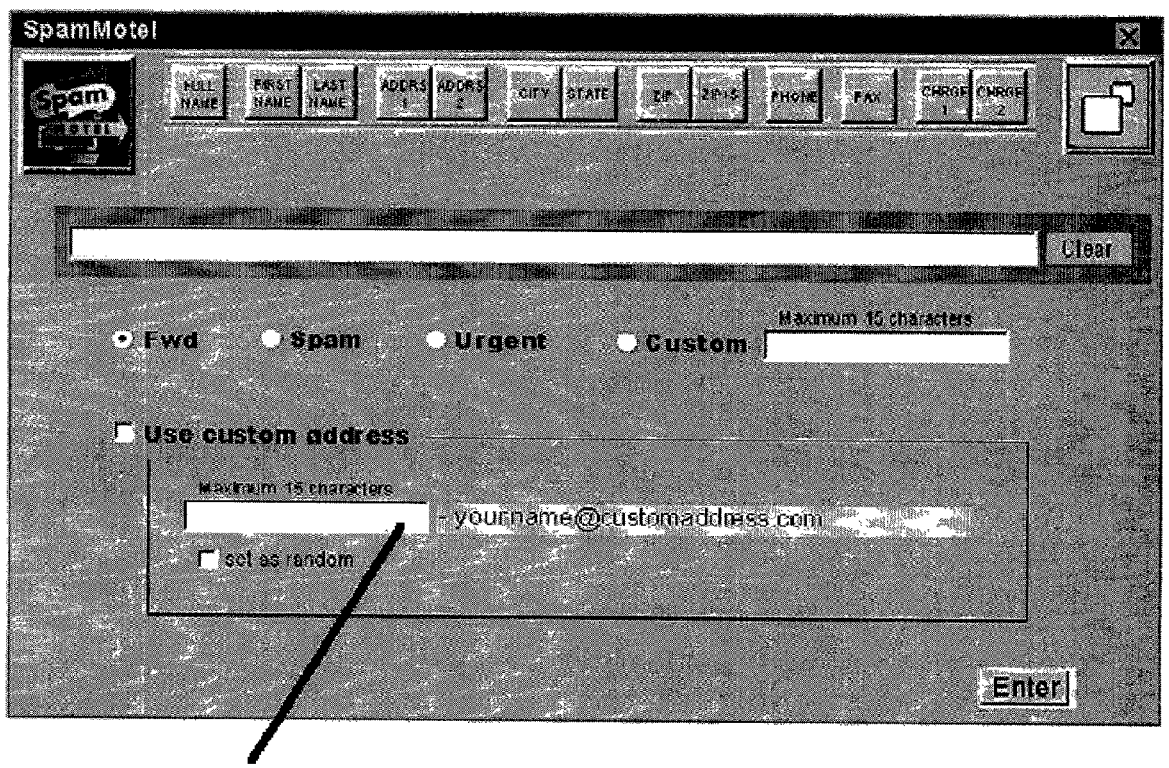
FIG. 9 depicts an input screen produced by an alternative embodiment of the Client Control Program of the current invention

Referring now to FIG. 9, an alternative embodiment contains, a provision to allow the user to incorporate his own name into the alias Email address. The screen shown in FIG. 8 is produced in place of that of FIG. 4 when a new alias Email address is requested by the user.

This embodiment allows the user to issue an Alias Email address, and transmit it to the recipient, without the need to access a computer or similar device at the time of issuance. Under such circumstances, the user will enter the Alias Email address, and other information, into the Client Control Program at a later time.

As shown in FIG. 8, the alias Email address is composed of three parts: a prefix, which may either be created by the user by typing it into box 480; or, as an alternative, the user may request a pseudo-random character string, as in the preferred embodiment. The second part of the alias Email address is a "dash" (-) character, followed by the user name as entered into the Client Control Program as part of the system setup. And the third part of the name, following the "@" sign, is the Alias Email Server address.

Thus, in the example previously used for user joedoe, the alias Email address might be "amazon-joedoe@dashmail.com, in the case where the user wished to identify an alias Email address to be used in communicating with Amazon.com®. the well-known e-Commerce company.

It is important to note that incoming e-mails are checked against the database to determine whether there are existing entries (memos, etc.) for that Dashmail address. If no entry exists, the Email is flagged with an indicator in the subject line. This allows the user to spot the missing entry, and also allows for such e-mails to be diverted to a separate folder for review.

This is a key element of the dashmail embodiment. Without this functionality, anyone could send an Email to the user and "get through". Its incorporation provides means for blocking unwanted responses.

The default setting is to let everything through, that is, to be forwarded to the user. This is because the user may forget to make an entry or has not yet had time to make an entry before receiving e-mails to a given address.

The suggested protocols for the flags in the subject line are:

(a) Fwd: Emails with entries. This may be changed by user to a custom prefix.
(b) fwd: Emails using the root name only, when the "from" address has been placed in a "friends and family" list.
(c) x-Fwd: Emails without entries, but with a prefix. Usually these are Emails for which the user will add an entry.
(d) xfwd: Emails using the root name only, not found in "friends and family" list.

The user may choose to block all e-mails containing either of the "x" flags.

The Dashmail alternative embodiment may use or accept alternate forms of address with the same basic function. These would most likely be the dash, the dot, and the underscore. And may also use the following form:
prefix@username.programname.com instead of:
prefix-username@programname.com
For users having access to their own domains, the form:
prefix@username.com
may also be use.

While the invention has been described with reference to specific embodiments, it will be apparent that improvements and modifications may be made within the purview of the invention without departing from the scope of the invention defined in the appended claims.

I claim:

1. In a computer data communications network, a method for a user to control and organize email messages further comprising a subject line and a message body, the method comprising the steps of:
    a) Configuring a system comprising:
        1) an email client program comprising a user email address, and residing on a user computer;
        2) a user email server which communicates with the email client program over the data communications network;
        3) an alias email server which communicates with the user email server over the data communications network; and
        4) a client control system residing on the user computer which communicates with the alias email server over the data communications network;
    b) entering of the user email address, corresponding identification information, and filter commands into the client control system by the user;
    c) transmitting the user email address, the filter commands, and the corresponding identification information, from the client control system to the alias email server;
    d) storing the user email address, the filter commands, and the corresponding identification information in the alias email server;
    e) automatically generating a first alias email address by the alias email server, not generated from the user address, and not generated from a recipient address, and storing said first alias email address in the alias email server;
    f) transmitting the first alias email address by the alias email server to the client control system;
    g) transmitting a message comprising the first alias email address as a sender address by the alias email server to a recipient;
    h) receiving by the alias email server of a reply message addressed to the first alias email address;
    i) storing information regarding the reply message in the alias email server;
    j) if the stored filter commands do not cause the alias email server to block the reply message, then forwarding by the alias email server of the reply message, together with the identification information, to the user address via the user email server;
    k) sending a subject line prefix from the client control program to the alias email server;
    l) sending user memo information from the client control program to the alias email server;
    m) storing the user memo information and user subject line prefix in the alias email server;
    n) inserting the user subject line prefix into the subject line of the reply message and inserting the user memo information into the message body of the reply message, so that the recipient is unaware of the user email address, and the user is apprised of the first alias email address and the corresponding identification information of said reply message, and the user can easily associate the alias email address with the reply message and recipient.

2. The method of claim 1, further comprising, after receiving a message from a recipient addressed to the first alias email address:
    (a) selecting by the user of the Reply function of an email client program;
    (b) inputting of a reply message by the user;
    (c) transmitting of the user's reply message to the Alias email server:
    (d) stripping of the user's reply message of all information which could identify the user's physical email address by the Alias email server; and
    (e) forwarding the stripped reply message to the recipient.

3. The method of claim 1, wherein the generating of the alias email address further comprises substantially random character generating.

4. The method of claim 1, further comprising entering one or more additional physical email addresses into the client control program, and receiving an additional alias email address corresponding to each additional physical email address.

5. The method of claim 4, further comprising entering a request by the client control program for one or more additional alias addresses corresponding to each physical address, and receiving by the client control program an additional alias email address corresponding to each such request.

6. The method of claim 1, further comprising entering a request by the client control program to suspend forwarding by the alias email server to the email client program of all email addressed to a particular alias email address.

7. The method of claim 1, further comprising entering a request by the client control program to permanently discontinue receipt by the email client program of all email addressed to a particular alias email address.

8. The method of claim 1, further comprising generating by the client control program of an alias email address containing a user name, and filtering the email at the Alias email Server.

9. The method of claim 1, further comprising transmitting by the user a message to two or more recipients using the same alias first email address and the same identification information.

10. The method of claim 1, wherein the filter commands further comprise:

(a) rejecting all messages addressed to the first alias email address at the alias email server;
(b) suspending receipt of all messages addressed to the first alias email address by the alias email server; and
(c) restoring receipt of all messages addressed to the first alias email address at the alias email server.

11. The method of claim 1, further comprising:
(a) entering one or more additional alias email addresses and identification information associated with each such additional alias email address by the user;
(b) generating a log by the client control program, and displaying the log to the user, the log comprising, for each alias email address;
(i) the date of the generation of the alias email address;
(ii) the alias email address; and
(iii) the corresponding identification information.

12. The method of claim 1, whereby
(a) the email messages further comprise a subject and a body; and
(b) the identification information comprises a first identification message and a second identification message, and whereby the method further comprises:
(i) appending by the alias email server of the first identification message to the subject; and (
ii) appending by the alias email server of the second identification message to the body.

13. The method of claim 1, further comprising inserting the user subject line prefix into header fields of the email message wherein the header fields further comprise a FROM line, a CC line, and a BCC line.

14. The method of claim 1, further comprising:
a) transmitting to the client control program by the alias email server of statistical information which further comprises:
1) the alias email address;
2) a time and date of the creation of the alias email address;
3) a message number;
4) the subject line prefix;
5) the user memo information; and
6) a number of messages received;
7) a number of messages forwarded;
8) a previous message received; and
b) sorting of said statistical information by the client control program by either
1) a date received;
2) a status, comprising suspension of message or resuming of messages;
3) a number of total messages received from a particular recipient; or
4) the date of the creation of the alias email address.

* * * * *